(12) United States Patent
Peng et al.

(10) Patent No.: US 9,432,645 B2
(45) Date of Patent: Aug. 30, 2016

(54) INFORMATION PROCESSING METHOD AND ELECTRONIC DEVICE

(71) Applicant: Lenovo (Beijing) Co., Ltd., Beijing (CN)

(72) Inventors: Fangzhen Peng, Beijing (CN); Jiaming Tao, Beijing (CN)

(73) Assignee: Lenovo (Beijing) Co. Ltd., Beijing (CN)

( * ) Notice: Subject to any disclaimer, the term of this patent is extended or adjusted under 35 U.S.C. 154(b) by 187 days.

(21) Appl. No.: 14/193,096

(22) Filed: Feb. 28, 2014

(65) Prior Publication Data

US 2014/0247275 A1  Sep. 4, 2014

(30) Foreign Application Priority Data

Mar. 1, 2013  (CN) .......................... 2013 1 0066321

(51) Int. Cl.
*G09G 5/06* (2006.01)
*G03B 21/14* (2006.01)
*H04N 9/31* (2006.01)

(52) U.S. Cl.
CPC .............. *H04N 9/3182* (2013.01); *H04N 9/31* (2013.01); *H04N 9/3194* (2013.01)

(58) Field of Classification Search
None
See application file for complete search history.

(56) References Cited

U.S. PATENT DOCUMENTS

| 7,929,758 | B2 | 4/2011 | Cho et al. |
| 8,593,482 | B2 | 11/2013 | Furui |
| 2002/0180999 | A1* | 12/2002 | Kanai ................. G09G 3/002 358/1.9 |
| 2003/0011563 | A1* | 1/2003 | Wada ................... H04N 9/73 345/156 |
| 2007/0154086 | A1 | 7/2007 | Cho et al. |
| 2007/0273837 | A1 | 11/2007 | Furui |
| 2008/0036976 | A1* | 2/2008 | Han ................... H04N 9/3194 353/69 |
| 2010/0201894 | A1* | 8/2010 | Nakayama ............. G03B 21/00 348/745 |
| 2011/0063518 | A1 | 3/2011 | Furui |
| 2011/0188008 | A1* | 8/2011 | Maeda ................. G03B 21/14 353/85 |

FOREIGN PATENT DOCUMENTS

| CN | 1992912 A | 7/2007 |
| CN | 101079250 A | 11/2007 |
| CN | 101917631 A | 12/2010 |

OTHER PUBLICATIONS

First Chinese Office Action regarding Application No. 201310066321.7 dated Jun. 18, 2015. English translation provided by http://globaldossier.uspto.gov.

* cited by examiner

*Primary Examiner* — Kee M Tung
*Assistant Examiner* — Yi Wang
(74) *Attorney, Agent, or Firm* — Harness, Dickey & Pierce, P.L.C.

(57) ABSTRACT

An information processing method and an electronic device are provided. First image information of the first projection plane is collected by an image collection unit at a first time; a set of color information of the first projection plane in the first image information which indicates color of the first projection plane is acquired; a first color adjusting template is generated based on the set of color information of the first projection plane, and the first color adjusting template includes a set of second color information; color adjustment is performed on each of M projection images after the first time in the electronic device based on the first color adjusting template, to generate M second projection images; the second projection image is then projected onto the first projection plane.

6 Claims, 2 Drawing Sheets

INFORMATION PROCESSING METHOD AND ELECTRONIC DEVICE

The present application claims the priority to Chinese Patent Application No. 201310066321.7, entitled "INFORMATION PROCESSING METHOD AND ELECTRONIC DEVICE", filed on Mar. 1, 2013 with the Chinese State Intellectual Property Office, which is incorporated herein by reference in its entirety.

FIELD

The present disclosure relates to the field of electronic technology, and particularly to an information processing method and an electronic device.

BACKGROUND

With the development of science and technology and thus the rapid development of the electronic technology, there are more and more kinds of electronic products and people enjoy various conveniences brought by the development of science and technology. Nowadays, people enjoy a comfortable life by various kinds of electronic devices as the development of science and technology.

Conventionally, the projection devices are used to conduct projection display to achieve projection effect of large area, therefore, large screen display can be perform in an area chosen by a user. For example, a smart projection television, as a clever combination of a smart television and a projector, has no traditional physical display device and television content is projected onto a plane such as a wall, so as to obtain a larger display area. For better projection effect, traditional projectors are generally equipped with white projection screens and content is projected onto the screen, therefore, color of the projection content is not affected, and better display effect can be achieved.

However, for a household projection device, hanging a projection screen in a bedroom or a living room seems unsuitable and projecting content onto a wall meets the family needs better. The projecting effect is good if color of the projection area on the wall is white as the color of the projection screen of the projector. However, many families decorate the wall with light color such as light blue or light yellow, or with wallpaper having patterns. In this case, since the projection mode of the existing projection device is single and projection images can not be adjusted according to different projection environments, the projection effect and user experience are poor.

SUMMARY

An information processing method and an electronic device are provided, to solve the technical problems that the projection mode of the projection device is single and projection images can not be adjusted according to different projection environments. The technical solutions are described as follows.

An information processing method is provided, which is applied to an electronic device, the electronic device comprising or being connected to a projection display unit and comprising or being connected to an image collection unit, where the method includes:

collecting first image information of a first projection plane by the image collection unit at a first time if a first projection image needs to be projected onto the first projection plane by the projection display unit;

acquiring a set of color information of the first projection plane in the first image information which indicates color of the first projection plane;

generating a first color adjusting template based on the set of color information of the first projection plane, where the first color adjusting template includes a set of second color information;

performing, based on the first color adjusting template, color adjustment on each of M projection images after the first time in the electronic device, to generate M second projection images; and projecting the second projection image onto the first projection plane, where a first difference exists between color of a raw projection image and color of a projected image projected onto the first projection plane viewed by a user after the second color information and the color information of the first projection plane are superimposed with each other, and a second difference exists between color of the raw projection image and color of a projected image directly projected onto the first projection plane without the first color adjusting template viewed by the user, the first difference is less than the second difference.

Optionally, the acquiring a set of color information of the first projection plane in the first image information which indicates color of the first projection plane includes:

parsing the first image information, to acquire a first color of each of pixel points in the first image information, and acquiring a first image coordinate position of each of the pixel points in the first image information; and generating the set of color information of the first projection plane which indicates color of the first projection plane based on the first color of each of the pixel points and the first image coordinate position of each of the pixel points.

Optionally, the generating a first color adjusting template based on the set of color information of the first projection plane includes:

determining, based on the first color of each of the pixel points, a second color which is different from the first color, and using the second color as a template color;

acquiring, based on the first image coordinate position of each of the pixel points, a second image coordinate position of the template color in the first color adjusting template; and generating, based on the template color and the second image coordinate position, the first color adjusting template for adjusting the M projection images.

Optionally, after the projecting the second projection image onto the first projection plane, the method further includes:

detecting whether there is first information by a detection apparatus in the electronic device, where the first information is information for indicating whether the first projection plane needs to be re-detected;

in a case where the first information indicates that the first projection plane needs to be re-detected, acquiring second image information of a second projection plane, and acquiring a set of color information of the second projection plane in the second image information which indicates color of the second projection plane;

acquiring, based on the set of color information of the second projection plane, a second color adjusting template for adjusting a projection image of the electronic device; and adjusting a color adjusting template of the electronic device from the first color adjusting template to the second color adjusting template, and performing color adjustment on each image frame of the electronic device based on the second color adjusting template.

Optionally, the detecting whether there is first information by a detection apparatus in the electronic device includes:

detecting whether the electronic device has a first acceleration by an acceleration sensor in the electronic device.

Optionally, in a case where it is determined by the first information that the first projection plane is changed, acquiring second image information of the second projection plane, and acquiring second color information in the second image information which indicates color of the second projection plane includes:

in a case where the first acceleration exists, determining whether the first acceleration value and a current speed are decreased to 0, and generating a determination result; and in a case where the determination result indicates that the first acceleration value and the current speed are decreased to 0, acquiring the second image information of the second projection plane, and acquiring the second color information in the second image information which indicates color of the second projection plane.

Optionally, the detecting whether there is first information by a detection apparatus in the electronic device includes:

detecting, by the image collection unit, color change information which indicates whether color of the first projection plane is changed.

Optionally, the detecting whether there is first information by a detection apparatus in the electronic device includes:

detecting, by a distance detection apparatus in the electronic device, distance change information which indicates whether a distance between the electronic device and the first projection plane is changed.

Optionally, in a case where it is determined by the first information that the first projection plane is changed, acquiring second image information of the second projection plane, and acquiring second color information in the second image information which indicates color of the second projection plane includes:

in a case where the distance change information indicates that the distance between the electronic device and the first projection plane is changed, acquiring a first distance between the electronic device and the first projection plane and a second distance between the electronic device and the second projection plane;

determining whether the second distance is less than the first distance, and generating a determination result; and in a case where the determination result indicates that the second distance is less than the first distance, acquiring the second image information of the second projection plane, and acquiring the second color information in the second image information which indicates color of the second projection plane.

An electronic device is provided, including:

a collection unit, configured to collect first image information of a first projection plane by an image collection unit at a first time if a first projection image needs to be projected onto the first projection plane by a projection display unit;

an acquiring unit, configured to acquire a set of color information of the first projection plane in the first image information which indicates color of the first projection plane;

a template generating unit, configured to generate a first color adjusting template based on the set of color information of the first projection plane, where the first color adjusting template includes second color information;

an adjustment unit, configured to perform, based on the first color adjusting template, color adjustment on each of M projection images after the first time in the electronic device, to generate M second projection images; and a processing unit, configured to project the second projection image onto the first projection plane, where a first difference exists between color of a raw projection image and color of a projected image projected onto the first projection plane viewed by a user after the second color information and the color information of the first projection plane are superimposed with each other, and a second difference exists between color of the raw projection image and color of a projected image directly projected onto the first projection plane without the first color adjusting template viewed by the user, the first difference is less than the second difference.

Optionally, the acquiring unit includes:

a parsing module, configured to parse the first image information, to acquire a first color of each of pixel points in the first image information, and acquire a first image coordinate position of each of the pixel points in the first image information; and an information generating module, configured to generate the set of color information of the first projection plane which indicates color of the first projection plane based on the first color of each of the pixel points and the first image coordinate position of each of the pixel points.

Optionally, the template generating unit includes:

a determination module, configured to determine, based on the first color of each of the pixel points, a second color which is different from the first color, and using the second color as a template color;

an acquiring module, configured to acquire, based on the first image coordinate position of each of the pixel points, a second image coordinate position of the template color in the first color adjusting template; and a template generating module, configured to generate, based on the template color and the second image coordinate position, the first color adjusting template for adjusting the M projection images.

Optionally, the electronic device further includes:

a detection unit, configured to detect whether there is first information by a detection apparatus in the electronic device, where the first information is information for indicating whether the first projection plane needs to be re-detected.

Optionally, the detection apparatus is an acceleration sensor, an image collection apparatus or a distance detection apparatus.

In the embodiments described above, first image information of the first projection plane is collected by an image collection unit at a first time; a set of color information of the first projection plane in the first image information which indicates color of the first projection plane is acquired; a first color adjusting template is generated based on the set of color information of the first projection plane, and the first color adjusting template includes a set of second color information; color adjustment is performed on each of M projection images after the first time in the electronic device based on the first color adjusting template, to generate M second projection images; and the second projection image is projected onto the first projection plane. Therefore, problems that the projection mode of the projection device is single and projection images can not be adjusted according to different projection environments are solved. With the above process, the projection mode of the projection device is diversified and real-time adjustment to the projection images based on characteristics of the projection plane is achieved, thereby improving the projection processing capability of the electronic device, allowing the projection device to be used in different scenarios, and improving user experience.

In the embodiments of the disclosure, it is determined whether the projection plane needs to be re-detected by detecting the state of the electrode device and the external environment of the electronic device in real time by a detection unit in the electronic device, thereby realizing a real-time control of the color adjusting mode by the electronic device, improving ability of the electronic device in information processing in various environments, and improving user experience.

DETAILED DESCRIPTION

Figure 1:
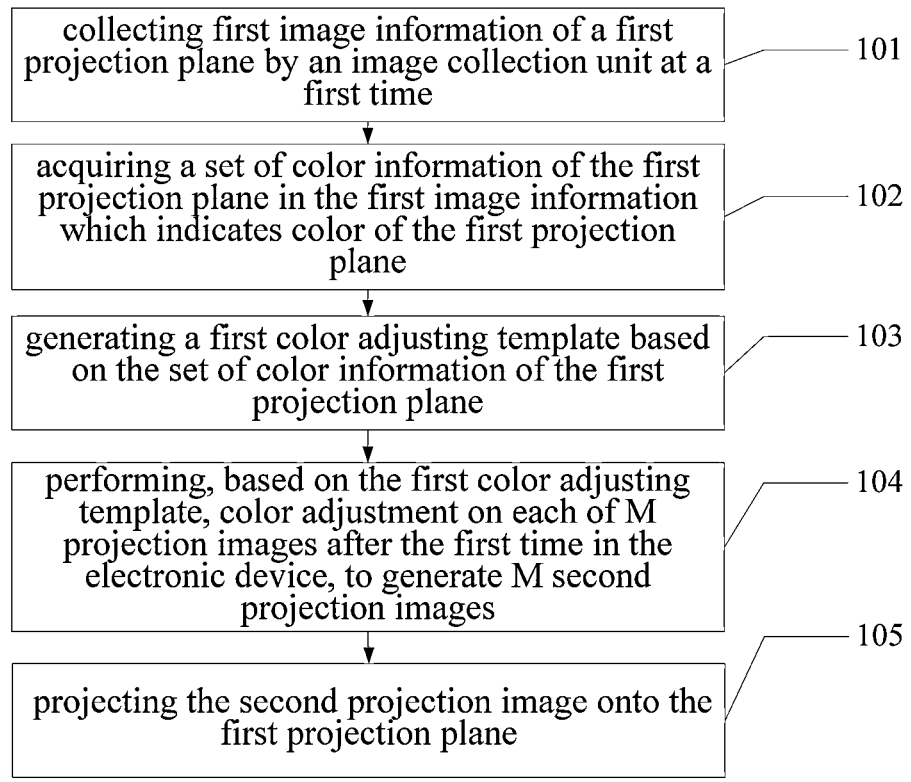
FIG. 1 illustrates a flow chart of an information processing method according to an embodiment of the disclosure.

An information processing method which is applied to an electronic device is provided by the disclosure. The electronic device includes or is connected to a projection display unit and includes or is connected to an image collection unit. The method includes: collecting first image information of a first projection plane by an image collection unit at a first time if a first projection image is to be projected onto the first projection plane by the projection display unit; acquiring a set of color information of the first projection plane in the first image information which indicates color of the first projection plane; generating a first color adjusting template based on the set of color information of the first projection plane; performing, based on the first color adjusting template, color adjustment on each of M projection images after the first time in the electronic device, to generate M second projection images; and projecting the second projection image onto the first projection plane, where a first difference exists between color of a raw projection image and color of a projected image projected onto the first projection plane viewed by a user after the second color information and the color information of the first projection plane are superimposed with each other, and a second difference exists between color of the raw projection image and color of a projected image directly projected onto the first projection plane without the first color adjusting template viewed by the user, the first difference is less than the second difference.

In the embodiment of the disclosure, if projection is to be performed by the electronic device, an image of a projection plane corresponding to the electronic device is collected by the image collection unit included in or connected to the electronic device, and color of the projection plane is determined based on the image. In a case where the projection plane is not white, the display effect of the projection image is affected if the projection image is projected onto the projection plane directly. Therefore, after the color of the projection plane is obtained, the color of the image to be projected needs to be adjusted based on the color of the projection plane, so that when the projection image with adjusted color is projected onto the projection plane, color viewed by the user in a case where the color of the projection image and the color of the projection plane are superimposed equals to the color of the raw projection image.

The technical solution of the disclosure is described in detail below by the accompanying drawings and specific embodiments. It should be understood that the embodiments of the disclosure and the specific technical features of the embodiments only intend to illustrate the technical solution of the disclosure in detail, but not limit the technical solution of the disclosure. The embodiments and the specific technical features of the embodiments of the disclosure may be combined with each other if there is no conflict.

FIG. 1 illustrates a flow chart of an information processing method according to an embodiment of the disclosure. The method includes the following steps.

Step 101 is collecting first image information of a first projection plane by an image collection unit at a first time.

It should be noted that the method is applied to an electronic device in the embodiment of the disclosure. The electronic device includes or is connected to a projection display unit and includes or is connected to an image collection unit. When the electronic device is moved by the user to the position to be projected onto, the electronic device starts the image collection unit in the electronic device for collecting first image information of the first projection plane corresponding to the electronic device. The first image information includes color of the first projection plane.

After the color of the first projection plane is acquired, step 102 is performed by the electronic device.

Step 102 is acquiring a set of color information of the first projection plane in the first image information which indicates color of the first projection plane.

After the first image information is acquired in step 101, the first image information is parsed by the electronic device. The parsing process includes parsing each of pixel points in the first image information. Each of the pixel points in the first image information has its own color (i.e., one of three-primary colors of Red, Green, and Blue (RGB)). Therefore, in the embodiment of the disclosure, color information of each of the pixel points is parsed after the first image information is acquired, and the position of each of the pixel points in the image coordinate system of the first image information is determined, that is, a first image coordinate position of each of the pixel points in the first image information is acquired.

The same color among the acquired color of each of the pixel points is classified by the electronic device, that is, after the color of each of the pixel points is acquired, the electronic device takes the pixel points having the same color as one classification, and determines that the color of this classification is a first color and then determines the area corresponding to the first color as a first area. In this way, all colors in the first image information are classified, and the area corresponding to each color is obtained.

For example, the electronic device is a projection device, and the projection plane corresponding to the projection device is a wall on which a first area is a red area. A first image of the wall is collected by the image collection unit in the projection device, and the first image is parsed. In the embodiment of the disclosure, each of pixel points in the first image is parsed, and the color of each of the pixel points and the coordinate position of each of the pixel points are acquired by the electronic device in the parsing process. Specifically, in the embodiment, it is determined in the parsing process of the image information that only white and red colors are included, the electronic device then takes the pixel points having the same color as one classification, and acquires the coordinate position of each of the classified pixel points in the image coordinate systems.

Figure 2:
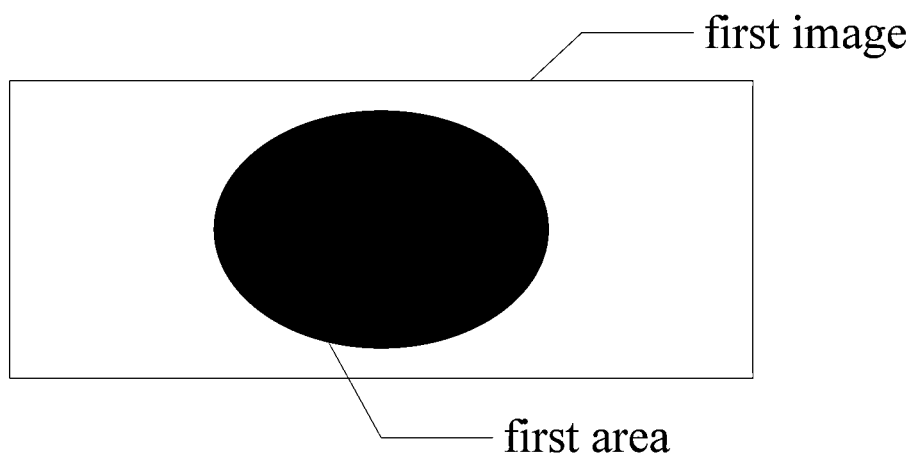
FIG. 2 illustrates a schematic diagram of a first image including areas of two colors according to an embodiment of the disclosure.

As shown in FIG. 2, the first image includes a first area. The first area in the first image is a red area, and other area in the first image is a white area. Points in the red area and coordinate positions corresponding to these points are then acquired by the electronic device.

After different colors of different areas are acquired by the electronic device, step 103 is performed by the electronic device.

Step 103 is generating a first color adjusting template based on the set of color information of the first projection plane.

In the embodiment of the disclosure, after the color and the coordinate position of each of the pixel points in the first image information are acquired by the electronic device based on the first image information, a template, whose size is identical to the size of the image collected by the image collection unit, is generated by the electronic device. An area which is to be filled with color is determined on the template based on the coordinate position of each of the pixels points, and other areas the colors of which are required to be adjusted are determined based on other coordinate positions.

Figure 3:
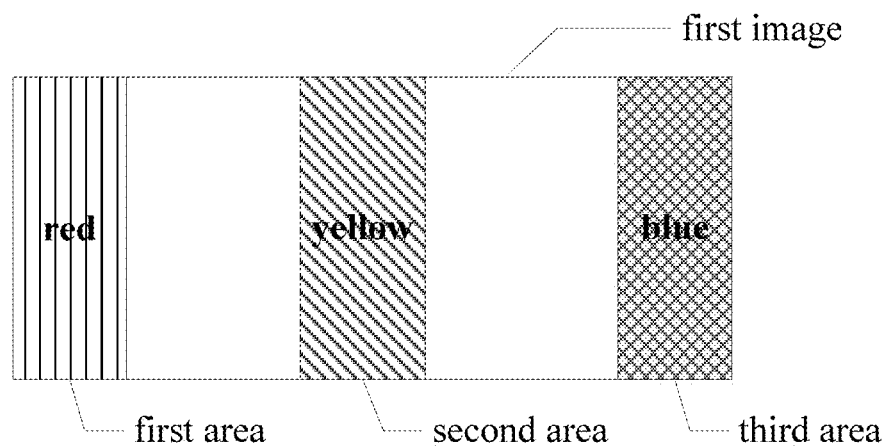
FIG. 3 illustrates a schematic diagram of a first image including areas of four colors according to an embodiment of the disclosure.

For example, a first image collected by the image collection unit includes three areas, and colors of the three areas are different from each other. Coordinates of each of pixel points in each area are also acquired by the projection device. Then after a temporary template is generated by the electronic device, areas on the temporary template are determined by the electronic device based on the determined coordinates of pixel points included in each area. In the embodiment, there are three areas which are a first area of red, a second area of green and a third area of blue, other area is white (as shown in FIG. 3).

Therefore, three areas on the temporary template which have the same positions as those of the three areas in the first image are generated by the electronic device. Colors corresponding to the three areas in the first image, i.e., red, green and blue, are then acquired by the electronic device. In practice, a white background color is required by the user, therefore, if the projection image is projected directly onto the wall by the electronic device, the viewing effect is poor or the content in the projection image can not be viewed clearly by the user, which results in a bad user experience.

Therefore, in the embodiment of the disclosure, if it is detected by the electronic device that there are two different colors in the first image, it is determined by the electronic device that the projection image should not be projected directly. If an image as shown in FIG. 3 is captured by the electronic device, it is determined by the electronic device that red, green, blue and white colors are in the first image, where the white color meets the background requirement of the user. Therefore, in generating the first color adjusting template, color of the first color adjusting template is determined based on the three colors of red, green and blue. That is, in a case where the first area is red, a projection image for color adjusting needs to be projected onto the first area by the electronic device. Cyan is the color which can be superimposed with red to form white, therefore, a first color adjusting area of the first color adjusting template is filled with cyan by the electronic device, and the distance between the first area of the first image and the area of the first color adjusting area of the first color adjusting template on the wall is not greater than 20 mm. In a preferable embodiment, the first area is completely superposed with the first color adjustment area.

The color adjusting template is not directly projected by the electronic device after the first area is determined, but color adjustment is performed on the green color in the second area by the electronic device after the color adjustment of the first area. Red is the color which can be superimposed with green to form white, therefore, the second area of the first color adjusting template is filled with red. Similarly, yellow is the color which can be superimposed with blue of the third area to form white, therefore, the third area of the first color adjusting template is filled with yellow. After all color-adjusted areas are obtained by the electronic device, step 104 is performed by the electronic device.

Step 104 is performing, based on the first color adjusting template, color adjustment on each of M projection images after the first time in the electronic device, to generate M second projection images.

Although three common colors are exemplified in the embodiment, the solution of the embodiment of the disclosure is also suitable for various other colors, and corresponding matched colors may be found based on the various other colors. In addition, other color may be specified by the user as a background color, such as green and red.

After the first color adjusting template is obtained by parsing the first image of the wall by the electronic device in step 103, the electronic device enables the adjustment for the projection image. From the time that the first color adjusting template is obtained, the electronic device adjusts each of M projection images output from the electronic device based on the first color adjusting template, Specifically, if a picture is to be projected onto the wall analyzed by the electronic device, the obtained first color adjusting template is superimposed with the picture by the electronic device, that is, the picture includes not only all colors of itself, but also all colors in the first color adjusting template.

If the electronic device is connected to or includes two projection units, the first color adjusting template is not needed to be superimposed with the picture but is directly projected onto the plane having color by one of the two projection units, and the picture is projected onto the area by another projection unit.

After each of the M projection images is adjusted, the electronic device generates M second projection images and performs step 105.

Step 105 is projecting the second projection image onto the first projection plane.

After M second projection images are generated by the electronic device in step 104, the electronic device projects the generated M projection images onto the first projection plane. In this way, the second color information in the first color adjusting template and the color information of the first projection plane are superimposed with each other, and a first difference exists between the color of the projected image projected onto the first projection plane viewed by the user and the color of the raw projection image.

If the first projection image is not adjusted by the first color adjusting template or the second color adjusting template of the embodiment of the disclosure but is projected directly onto the first projection plane, a second difference exists between the color of the projected image viewed by the user and the color of the raw projection image. The first difference is less than the second difference. That is, a plane with a uniform color, which is a white plane in the embodiment of the disclosure, is formed after the first projection plane is adjusted based on the first color adjusting template. If the first projection plane is not adjusted based on the first color adjusting template, the color of the projection plane is superimposed with the color of the projection image, which directly affects the display effect of the projection image.

In the embodiments described above, first image information of the first projection plane is collected by an image collection unit at a first time; a set of color information of the first projection plane in the first image information which indicates color of the first projection plane is acquired; a first color adjusting template is generated based on the set of color information of the first projection plane, and the first color adjusting template includes a set of second color information; color adjustment is performed on each of M projection images after the first time in the electronic device based on the first color adjusting template, to generate M second projection images; the second projection image is then projected onto the first projection plane. In this way, the problems that the projection mode of the projection device is single and projection images can not be adjusted according to different projection environments are solved. Therefore, the projection mode of the projection device is diversified and real-time adjustment to the projection images based on characteristics of the projection plane is achieved, thereby improving the projection processing capability of the electronic device, allowing the projection device to be used in different scenarios, and improving user experience.

In addition, in the embodiment of the disclosure, the electronic device further includes a detection apparatus. The detection apparatus may detect whether there is first information, where the first information is information for indicating whether the first projection plane needs to be re-detected. If the first information indicates that the first projection plane needs to be re-detected, second image information of a second projection plane is acquired, and a set of color information of the second projection plane in the second image information which indicates color of the second projection plane is acquired.

A second color adjusting template for adjusting the projection image of the electronic device is acquired based on the set of color information of the second projection plane. Then, the color adjusting template in the electronic device is adjusted from the first color adjusting template to the second color adjusting template, and color adjustment is performed on each image frame in the electronic device based on the second color adjusting template.

Specifically, it is detected by the electronic device in real time whether the electronic device is moved, that is, whether the electronic device has a first acceleration. If the electronic device has the first acceleration or a current speed, it is determined by the electronic device that a second projection plane needs to be detected. However, the electronic device does not directly detect the second projection plane, but detects whether the first acceleration value and the current speed of the electronic device are decreased to 0. If the first acceleration value and the current speed are decreased to 0, the electronic device re-detects the projection plane, to acquire the second color information of the second projection plane.

For example, a user carrying the projection device moves from a first meeting room to an external environment. The projection plane of the first meeting room is different from the projection plane of the external environment, therefore, after the projection device is placed, the projection device acquires image information of a second projection plane of the external environment by the image collection unit included in or connected to the projection device, and then acquires second color information in the image information of the second projection plane which indicates color of the second projection plane.

As the embodiment described above, after the second color information is acquired, a second color adjusting template is generated by the electronic device based on the second color information, and then each image frame is adjusted by the electronic device, the detail of which is omitted herein.

In addition, in a case where external ambient light is variable, the color of the projection plane is changed with the external ambient light. Therefore, in the embodiment of the disclosure, the electronic device further includes an image collection apparatus configured to detect whether the color of the first projection plane is changed. If the first projection plane is changed, the electronic device determines that a second projection plane changed from the first projection plane needs to be detected, acquires second color information of the second projection plane, generates a corresponding second color adjusting template, and performs color adjustment on all images in the electronic device based on the second color adjusting template.

In addition, in the embodiment of the disclosure, the detection apparatus is a distance detection apparatus configured to detect whether a distance between the electronic device and the first projection plane is changed. If the distance between the electronic device and the first projection plane is changed, a first distance between the electronic device and the first projection plane and a second distance between the electronic device and the second projection plane are acquired, and it is determined whether the second distance is less than the first distance, to generate a determination result. If the determination result indicates that the second distance is less than the first distance, second image information of the second projection plane is acquired and second color information in the second image which indicates color of the second projection plane is acquired.

For example, a first projection of the projection device is performed on a wall, and there are many kinds of colors on the wall. In this case, the projection image of the projection device is adjusted using the first color adjusting template for projection effect. However, in a case where there is a projection screen between the wall and the projection device, the projection effect on the projection screen is affected if the original first color adjusting template is still used. Therefore, in the embodiment of the disclosure, in the case where there is a projection screen between the wall and the projection device, the projection device determines whether the wall or the projection screen is nearer to the projection device. The projection screen is nearer to the projection device in this embodiment. Therefore, the projection device acquires color information of the projection screen and adjusts each image frame of the projection device based on the obtained color information of the projection screen.

In addition, the method may be applied to not only the projection device, but also a mobile phone or a laptop computer with projection function or other electronic devices with projection function.

In the embodiment of the disclosure, it is determined whether the projection plane needs to be re-detected by detecting in real time the state of the electrode device and the external environment of the electronic device by the detection unit in the electronic device, thereby realizing a real-time control of the color adjustment mode by the electronic device, improving the information processing capability of the electronic device in different environments, and improving user experience.

Figure 4:
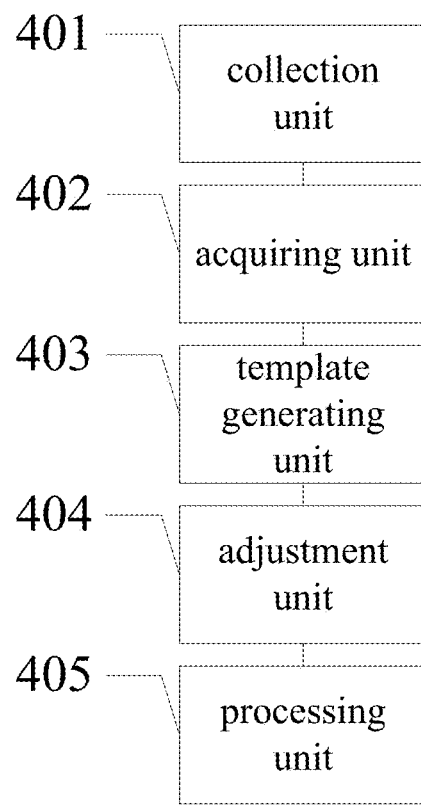
FIG. 4 illustrates a schematic structural diagram of an electronic device according to an embodiment of the disclosure.

Corresponding to the information processing method in the embodiment of the disclosure, an electronic device is further provided according to an embodiment of the disclosure. FIG. 4 illustrates a schematic structural diagram of an electronic device according to an embodiment of the disclosure, and the electronic device includes following units.

A collection unit 401 is configured to collect first image information of a first projection plane by an image collection unit at a first time if a first projection image is to be projected onto the first projection plane by a projection display unit.

An acquiring unit 402 is configured to acquire a set of color information of the first projection plane in the first image information which indicates color of the first projection plane.

A template generating unit 403 is configured to generate a first color adjusting template based on the set of color information of the first projection plane, where the first color adjusting template includes second color information.

An adjustment unit 404 is configured to perform, based on the first color adjusting template, color adjustment on each of M projection images after the first time in the electronic device, to generate M second projection images.

A processing unit 405 is configured to project the second projection image onto the first projection plane, where a first difference exists between color of a raw projection image and color of a projected image projected onto the first projection plane viewed by a user after the second color information and the color information of the first projection plane are superimposed with each other, and a second difference exists between color of the raw projection image and color of a projected image directly projected onto the first projection plane without the first color adjusting template viewed by the user, the first difference is less than the second difference.

Specifically, the electronic device further includes a detection unit configured to detect whether there is first information by a detection apparatus in the electronic device, where the first information is information for indicating whether the first projection plane needs to be re-detected. The detection apparatus may be an acceleration sensor, an image collection apparatus or a distance detection apparatus.

Specifically, the acquiring unit 402 includes:

a parsing module configured to parse the first image information, to acquire a first color of each of pixel points in the first image information, and acquire a first image coordinate position of each of the pixel points in the first image information; and an information generating module, configured to generate the set of color information of the first projection plane which indicates color of the first projection plane based on the first color of each of the pixel points and the first image coordinate position of each of the pixel points.

In addition, the template generating module 403 includes:

a determination module configured to determine, based on the first color of each of the pixel points, a second color which is different from the first color, and using the second color as a template color;

an acquiring module configured to acquire, based on the first image coordinate position of each of the pixel points, a second image coordinate position of the template color in the first color adjusting template; and a template generating module configured to generate, based on the template color and the second image coordinate position, the first color adjusting template for adjusting the M projection images.

In the embodiments described above, first image information of the first projection plane is collected by an image collection unit at a first time; a set of color information of the first projection plane in the first image information which indicates color of the first projection plane is acquired; a first color adjusting template is generated based on the set of color information of the first projection plane, and the first color adjusting template includes a set of second color information; color adjustment is performed on M projection images after the first time in the electronic device based on the first color adjusting template, to generate M second projection images; and the second projection image is projected onto the first projection plane. Therefore, problems that the projection mode of the projection device is single and projection images can not be adjusted according to different projection environments are solved. With the above process, the projection mode of the projection device is diversified and real-time adjustment to the projection images based on characteristics of the projection plane is achieved, thereby improving the projection processing capability of the electronic device, allowing the projection device to be used in different scenarios, and improving user experience.

In the embodiments of the disclosure, it is determined whether the projection plane needs to be re-detected by detecting the state of the electrode device and the external environment of the electronic device in real time by a detection unit in the electronic device, thereby realizing a real-time control of the color adjusting mode by the electronic device, improving ability of the electronic device in information processing in various environments, and improving user experience.

It should be known by those skilled in the art that the embodiment of the disclosure may be embodied as a method, a system or a computer program product. Therefore, a complete hardware embodiment, a complete software embodiment or a combination of hardware and software may be employed in the disclosure. Further, the disclosure may be embodied as a computer program product executed on one or more computer readable storage mediums (including but not limited to a magnetic disk memory, CD-ROM, and an optical memory) including a computer readable program code.

The disclosure is described by referring to flow charts and/or block diagrams of a method, a device (a system) and a computer program product according to the embodiments of the disclosure. It should be understood that each flow and/or each block in the flow chart and/or the block diagram, and a combination of a flow and/or a block in the flow chart and/or the block diagram may be implemented by computer program instructions. These computer program instructions may be provided to a general purpose computer, a special-purpose computer, an embedded processor or a processor of other programmable data processing device, to produce a machine, so that the instructions executed by the computer or the processor of other programmable data processing device produce an apparatus for realizing the function specified in a flow or flows in the flow chart and/or a block or blocks in the block diagram.

Alternatively, these computer program instructions may be stored in a computer readable storage which can guide the computer or the other programmable data processing device to operate in a particular way, so that the instructions stored in the computer readable storage produce an article including an instruction apparatus, and the instruction apparatus realizes the function specified in a flow or flows in the flow chart and/or a block or blocks in the block diagram.

Alternatively, these computer program instructions may be loaded into the computer or the other programmable data processing device, so that processing realized by the computer is implemented by executing a series of processing steps on the computer or the other programmable device, therefore, the instructions executed on the computer or the other programmable device provide steps for realizing the function specified in a flow or flows in the flow chart and/or a block or blocks in the block diagram.

Various modifications and variations may be made to the disclosure by those skilled in the art without departing from the sprit and scope of the disclosure. In this way, if these modifications and variations to the disclosure fall within the scope of the claims of the disclosure or the equivalents thereof, the disclosure intends to include these modifications and variations.

The invention claimed is:

1. An information processing method, which is applied to an electronic device, the electronic device comprising or being connected to a projection display unit and comprising or being connected to an image collection unit, wherein the method comprises:
   collecting first image information of a first projection plane by the image collection unit at a first time if a first projection image needs to be projected onto the first projection plane by the projection display unit;
   acquiring a set of color information of the first projection plane in the first image information that indicates color of the first projection plane;
   generating a first color adjusting template based on the set of color information of the first projection plane, wherein the first color adjusting template comprises a set of second color information;
   performing, based on the first color adjusting template, color adjustment on each of M projection images after the first time in the electronic device, to generate M second projection images; and
   projecting the second projection image onto the first projection plane, wherein a first difference exists between color of a raw projection image and color of a projected image projected onto the first projection plane, which is viewed by a user, after the second color information and the color information of the first projection plane are superimposed with each other, and a second difference exists between color of the raw projection image and color of a projected image directly projected onto the first projection plane without the first color adjusting template viewed by the user, the first difference is less than the second difference,
   wherein acquiring the set of color information of the first projection plane in the first image information that indicates the color of the first projection plane comprises:
      parsing the first image information to acquire a first color of each of pixel points in the first image information, and acquiring a first image coordinate position of each of the pixel points in the first image information; and
      generating the set of color information of the first projection plane that indicates the color of the first projection plane based on the first color of each of the pixel points and the first image coordinate position of each of the pixel points, and wherein generating the first color adjusting template based on the set of color information of the first projection plane comprises:
   determining, based on the first color of each of the pixel points, a second color that is different from the first color, and using the second color as a template color;
   acquiring, based on the first image coordinate position of each of the pixel points, a second image coordinate position of the template color in the first color adjusting template; and
   generating, based on the template color and the second image coordinate position, the first color adjusting template for adjusting the M projection images,
wherein after protecting the second projection image onto the first projection plane, the method further comprises:
   detecting whether there is first information by a detection apparatus in the electronic device, wherein the first information is information for indicating whether the first projection plane needs to be re-detected;
   in a case where the first information indicates that the first projection plane needs to be re-detected, acquiring second image information of a second projection plane, and acquiring a set of color information of the second projection plane in the second image information which indicates color of the second projection plane;
   acquiring, based on the set of color information of the second projection plane, a second color adjusting template for adjusting a projection image of the electronic device; and
   adjusting a color adjusting template of the electronic device from the first color adjusting template to the second color adjusting template, and performing color adjustment on each image frame of the electronic device based on the second color adjusting template,
wherein detecting whether there is first information by the detection apparatus in the electronic device comprises:
   detecting, by a distance detection apparatus in the electronic device, distance change information which indicates whether a distance between the electronic device and the first projection plane is changed,
wherein in a case where it is determined by the first information that the first projection plane is changed, acquiring second image information of the second projection plane, and acquiring second color information in the second image information which indicates color of the second projection plane comprises:
   in a case where the distance change information indicates that the distance between the electronic device and the first projection plane is changed, acquiring a first distance between the electronic device and the first projection plane and a second distance between the electronic device and the second projection plane;
   determining whether the second distance is less than the first distance, and generating a determination result; and
   in a case where the determination result indicates that the second distance is less than the first distance, acquiring the second image information of the second projection plane, and acquiring the second color information in the second image information which indicates color of the second projection plane.

2. The method according to claim 1, wherein the detecting whether there is first information by a detection apparatus in the electronic device comprises:
  detecting whether the electronic device has a first acceleration by an acceleration sensor in the electronic device.

3. The method according to claim 2, wherein in a case where it is determined by the first information that the first projection plane is changed, acquiring second image information of the second projection plane, and acquiring second color information in the second image information which indicates color of the second projection plane comprises:
  in a case where the first acceleration exists, determining whether a value of the first acceleration and a current speed are decreased to 0, and generating a determination result; and
  in a case where the determination result indicates that the value of the first acceleration and the current speed are decreased to 0, acquiring the second image information of the second projection plane, and acquiring the second color information in the second image information which indicates color of the second projection plane.

4. The method according to claim 1, wherein the detecting whether there is first information by a detection apparatus in the electronic device comprises:
  detecting, by the image collection unit, color change information which indicates whether color of the first projection plane is changed.

5. An electronic device, comprising a processor and a non-transitory processor-readable medium having processor-executable instructions stored thereon that, when executed by the processor, cause the electronic device to:
  collect first image information of a first projection plane by an image collection unit at a first time if a first projection image needs to be projected onto the first projection plane by a projection display unit;
  acquire a set of color information of the first projection plane in the first image information that indicates color of the first projection plane;
  a generate a first color adjusting template based on the set of color information of the first projection plane, wherein the first color adjusting template comprises second color information;
  perform, based on the first color adjusting template, color adjustment on each of M projection images after the first time in the electronic device, to generate M second projection images; and
  project the second projection image onto the first projection plane, wherein a first difference exists between color of a raw projection image and color of a projected image projected onto the first projection plane viewed by a user after the second color information and the color information of the first projection plane are superimposed with each other, and a second difference exists between color of the raw projection image and color of a projected image directly projected onto the first projection plane without the first color adjusting template viewed by the user, the first difference is less than the second difference,
  wherein acquiring the set of color information of the first projection plane in the first image information that indicates the color of the first projection plane comprises:
    parsing the first image information to acquire a first color of each of pixel points in the first image information, and acquiring a first image coordinate position of each of the pixel points in the first image information; and
  generating the set of color information of the first projection plane that indicates the color of the first projection plane based on the first color of each of the pixel points and the first image coordinate position of each of the pixel points, and
  wherein generating the first color adjusting template based on the set of color information of the first projection plane comprises:
    determining, based on the first color of each of the pixel points, a second color that is different from the first color, and using the second color as a template color;
    acquiring, based on the first image coordinate position of each of the pixel points, a second image coordinate position of the template color in the first color adjusting template; and
    generating, based on the template color and the second image coordinate position, the first color adjusting template for adjusting the M projection images,
    wherein the instructions further cause the electronic device to:
      detect whether there is first information by a detection apparatus in the electronic device, wherein the first information is information for indicating whether the first projection plane needs to be re-detected;
      in a case where the first information indicates that the first projection plane needs to be re-detected, acquire second image information of a second projection plane, and acquire a set of color information of the second projection plane in the second image information which indicates color of the second projection plane;
      acquire, based on the set of color information of the second projection plane, a second color adjusting template for adjusting a projection image of the electronic device; and
      adjust a color adjusting template of the electronic device from the first color adjusting template to the second color adjusting template, and perform color adjustment on each image frame of the electronic device based on the second color adjusting template,
    wherein detecting whether there is first information by the detection apparatus in the electronic device comprises:
      detecting, by a distance detection apparatus in the electronic device, distance change information which indicates whether a distance between the electronic device and the first projection plane is changed,
    wherein in a case where it is determined by the first information that the first projection plane is changed, acquiring second image information of the second projection plane, and acquiring second color information in the second image information which indicates color of the second projection plane comprises:
      in a case where the distance change information indicates that the distance between the electronic device and the first projection plane is changed, acquiring a first distance between the electronic device and the first projection plane and a second distance between the electronic device and the second projection plane;

determining whether the second distance is less than the first distance, and generating a determination result; and in a case where the determination result indicates that the second distance is less than the first distance, acquiring the second image information of the second projection plane, and acquiring the second color information in the second image information which indicates color of the second projection plane.

6. The electronic device according to claim 5, wherein the detection apparatus is an acceleration sensor, an image collection apparatus or a distance detection apparatus.

* * * * *